(12) United States Patent
Kita

(10) Patent No.: US 9,055,243 B2
(45) Date of Patent: Jun. 9, 2015

(54) IMAGE SHOOTING DEVICE

(75) Inventor: Yuki Kita, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 37 days.

(21) Appl. No.: 13/698,179

(22) PCT Filed: May 18, 2011

(86) PCT No.: PCT/JP2011/002761
§ 371 (c)(1),
(2), (4) Date: Nov. 15, 2012

(87) PCT Pub. No.: WO2011/145342
PCT Pub. Date: Nov. 24, 2011

(65) Prior Publication Data
US 2013/0063653 A1    Mar. 14, 2013

(30) Foreign Application Priority Data

May 19, 2010  (JP) .................................. 2010-115180

(51) Int. Cl.
| H04N 5/353 | (2011.01) |
| H04N 5/376 | (2011.01) |
| H04N 5/232 | (2006.01) |
| H04N 5/235 | (2006.01) |

(52) U.S. Cl.
CPC ............. *H04N 5/353* (2013.01); *H04N 5/3532* (2013.01); *H04N 5/23245* (2013.01); *H04N 5/2327* (2013.01); *H04N 5/2351* (2013.01); *H04N 5/2353* (2013.01); *H04N 5/2355* (2013.01); *H04N 5/3765* (2013.01)

(58) Field of Classification Search
CPC ...... H04N 5/351; H04N 5/353; H04N 5/3532; H04N 5/2327; H04N 5/2351; H04N 5/2353; H04N 5/2355; H04N 5/23245; H04N 5/3765
USPC ................................. 348/216.1, 229.1, 230.1
See application file for complete search history.

(56) References Cited

U.S. PATENT DOCUMENTS 7,956,925 B2 * 6/2011 Ogawa et al. ................. 348/362
8,248,520 B2 * 8/2012 Yonemitsu ..................... 348/371
(Continued)

FOREIGN PATENT DOCUMENTS

| JP | A-62-281574 | 12/1987 |
| JP | A-63-127679 | 5/1988 |

(Continued)

OTHER PUBLICATIONS

International Search Report issued in International Application No. PCT/JP2011/002761 dated Jun. 14, 2011.
(Continued)

*Primary Examiner* — Daniel M Pasiewicz
(74) *Attorney, Agent, or Firm* — Oliff PLC

(57) ABSTRACT

There is provided an image shooting device including a pixel part that is formed with a plurality of pixels arranged in a matrix, and a timing control part that provides an exposure start timing and a reading timing after exposure to the pixel part, in which the timing control part controls the exposure start timing and the reading timing such that a time interval between the exposure start timing and the reading timing is longer than the frame rate and that a row that outputs the reading timing is different for each frame when reading a plurality of successive images at a preset frame rate.

7 Claims, 8 Drawing Sheets

(56) References Cited

U.S. PATENT DOCUMENTS

| 8,605,177 B2* | 12/2013 | Rossi et al. ............ 348/296 |
| 8,934,037 B2* | 1/2015 | Suzuki ............ 348/296 |
| 2010/0171873 A1 | 7/2010 | Nakaseko |
| 2011/0063483 A1* | 3/2011 | Rossi et al. ............ 348/294 |

FOREIGN PATENT DOCUMENTS

| JP | A-2001-511628 | 8/2001 |
| JP | A-2005-117187 | 4/2005 |
| JP | A-2006-325073 | 11/2006 |
| JP | A-2010-183558 | 8/2010 |
| WO | WO 99/05853 | 2/1999 |

OTHER PUBLICATIONS

International Preliminary Report on Patentability issued in International Application No. PCT/JP2011/002761 dated Nov. 20, 2012 (with translation).

* cited by examiner

IMAGE SHOOTING DEVICE

CROSS-REFERENCE TO RELATED APPLICATION

This application is a U.S. National Stage application claiming the benefit of prior filed International Application Number PCT/JP2011/002761, filed May 18, 2011, in which the International Application claims a priority date of May 19, 2010 based on prior filed Japanese Patent Application Number 2010-115180, the entire contents of which are incorporated herein by reference.

TECHNICAL FIELD

The present application relates to a solid state image sensor single body and an image shooting device such as an electronic camera incorporating a solid state image sensor.

BACKGROUND ART

A general electronic camera can deal with images of various resolutions according to the function, such as a still image, a live image and a moving image. For example, in a CMOS-type solid state image sensor used widely in an electronic camera, only a necessary part of an image shooting screen can be read, and reading can be performed with rows thinned out (for example, see Patent Document 1).

On the other hand, in the shooting of a live image, a moving image or the like, an electronic shutter of a rolling shutter method is used. In the rolling shutter method, an operation of resetting charges accumulated in the photoelectric conversion parts of the individual pixels of a solid state image sensor arranged in a matrix and an operation of converting, after the resetting, the charges accumulated in the photoelectric conversion parts into electric signals and reading them are repeatedly performed in each row.

Patent Document 1: Japanese Unexamined Patent Application Publication No.

DISCLOSURE

Problems to be Solved

However, since the reset operation and the reading operation in the conventional rolling shutter method are performed on the same row within one frame, it is impossible to independently control the reset timing and the reading timing, and thus it is difficult to perform exposure for a time period longer than one frame period. Hence, when shooting is performed in a dark place, an SN ratio is disadvantageously degraded.

In view of the foregoing problem, a proposition of the present invention is to provide an image shooting device that can perform exposure for a time period longer than one frame period and that can obtain an image having a high SN ratio.

Means for Solving the Problems

According to the present invention, there is provided an image shooting device including a pixel part that is formed with a plurality of pixels arranged in a matrix, and a timing control part that provides an exposure start timing and a reading timing after exposure to the pixel part, in which the timing control part controls the exposure start timing and the reading timing such that a time interval between the exposure start timing and the reading timing is longer than the frame rate and that a row that outputs the reading timing is different for each frame when reading a plurality of successive images at a preset frame rate.

The image shooting device further includes a mode switching part that switches between a first mode in which the time interval between the exposure start timing and the reading timing of the timing control part is longer than the frame rate and a second mode in which the time interval between the exposure start timing and the reading timing is not longer than the frame rate, in which the timing control part controls the exposure start timing and the reading timing according to the mode set by the mode switching part.

The image shooting device further includes a photometry part that measures a brightness of a subject to be shot, in which the mode switching part switches between the first mode and the second mode according to a photometric value of the photometry part.

In the image shooting device, the timing control part outputs the reading timing to a plurality of pixels in the same row of the pixel part in a frame different from a frame that outputs the exposure start timing.

The image shooting device further includes an amplifier that is provided in each of the columns of the pixel part, in which an amplification factor of the amplifier is controlled according to the photometric value of the photometry part.

Since the image shooting device according to the present invention independently controls a reset timing and a reading timing, it is possible to perform an exposure longer than one frame period and to obtain an image having a higher SN ratio.

DETAILED DESCRIPTION OF THE EMBODIMENTS

Embodiments of an image shooting device according to the present invention will be described in detail below with reference to accompanying drawings. The image shooting device according to the present invention includes not only a solid state image sensor single body compatible with a rolling shutter method that is one of the electronic shutters but also a device, such as an electronic camera, a video camera or a mobile telephone with a camera, that incorporates a solid state image sensor to shoot an image.

(First Embodiment)

Figure 1:
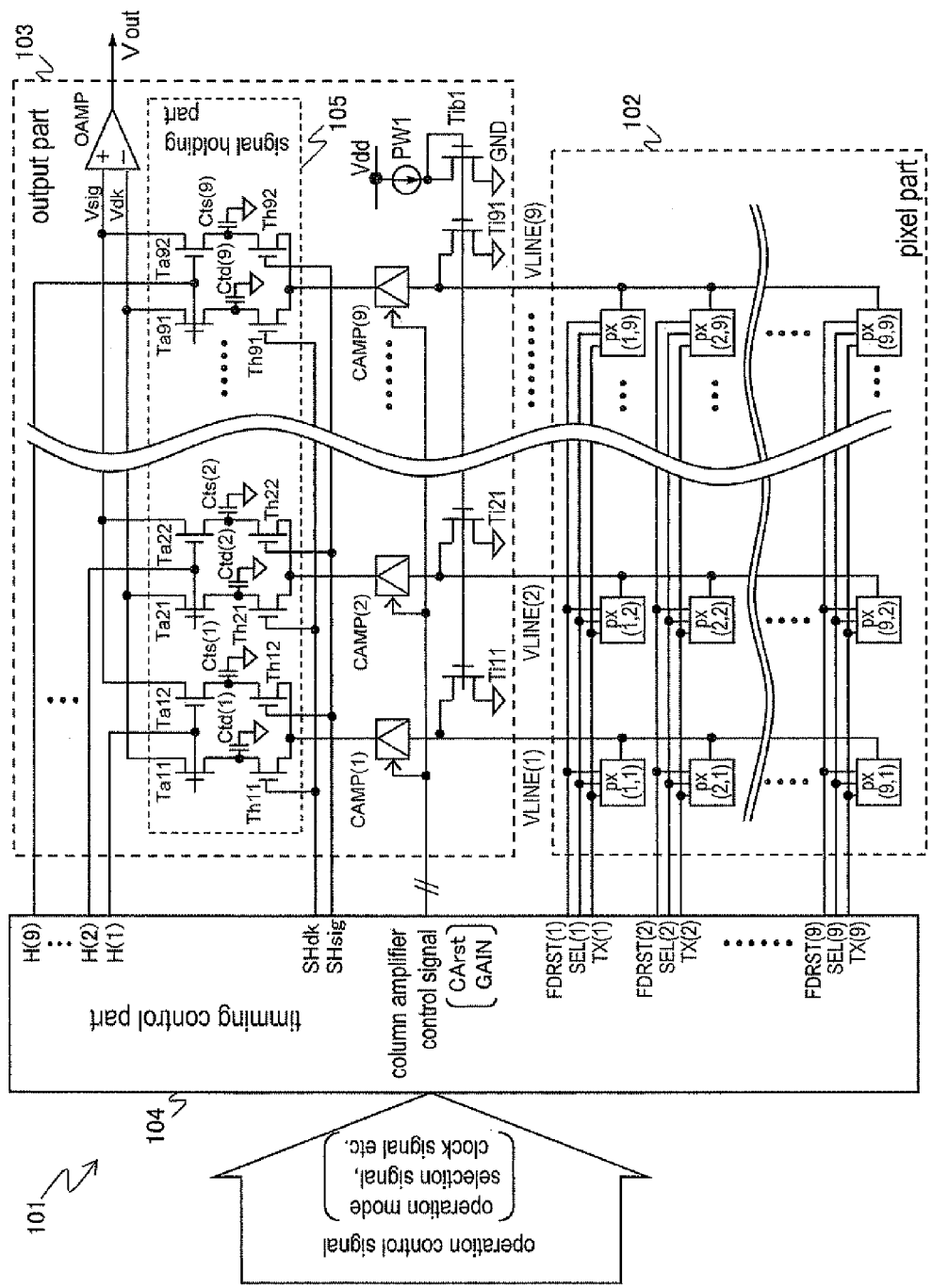
FIG. 1 is a diagram showing an example of the configuration of a solid state image sensor 101.

A solid state image sensor 101 will first be described as a first embodiment of an image shooting device according to the present invention. FIG. 1 is a block diagram showing the configuration of the solid state image sensor 101.

[Example of the Configuration of the Solid State Image Sensor 101]

In FIG. 1, the solid state image sensor 101 includes a pixel part 102, an output part 103 and a timing control part 104. An operation control signal is fed from outside to the timing control part 104. The operation control signal fed from outside includes a signal which selects the operation mode of the solid state image sensor 101, a clock signal on which an operation timing is based, a frame signal and the like. For example, the operation mode selection signal selects whether an electronic shutter is performed by the rolling shutter method or a global shutter method. Alternatively, the operation mode selection signal performs selection of the resolution of an image read from the solid state image sensor 101, setting of thinning-out reading, gain setting or the like. In the present embodiment, a case where the rolling shutter method is used to perform row thinning-out reading will be described. The rolling shutter method is one of the electronic shutters which, with subject light being constantly incident onto the solid state image sensor 101, controls a reset timing and a reading timing of a charge accumulated in each pixel of the solid state image sensor 101 and thus controls an exposure time to shoot an image; the shooting is sequentially performed in each row to acquire an image of one frame. In particular, the solid state image sensor 101 according to the present embodiment can select, when the shooting is performed with the rolling shutter method, two modes, that is, a "normal shooting mode" and a "high SN shooting mode." In the "normal shooting mode," a rolling shutter in which the exposure time for each row is less than one frame can be performed; in the "high SN shooting mode," a rolling shutter in which the exposure time for each row is longer than one frame period can be performed. These shooting modes will be described in detail later.

The individual parts of the solid state image sensor 101 of FIG. 1 will be described in detail below.

The pixel part 102 includes a plurality of pixels arranged in a matrix. Although, in FIG. 1, for facilitating understanding of the description, the pixel part 102 includes 81 pixels of 9 rows by 9 columns, the pixel part 102 actually has a few million pixels. In the pixel part 102, 9 pixels from a pixel px (1, 1) to a pixel px (9, 1) in the first row are connected to a vertical signal line VLINE (1), signals read into the vertical signal line VLINE (1) are input to the output part 103. Likewise, 9 pixels from a pixel px (1, 2) to a pixel px (9, 2) in the second row are connected to a vertical signal line VLINE (2), 9 pixels from a pixel px (1, 9) to a pixel px (9, 9) in the ninth row are connected to a vertical signal line VLINE (9) and signals are input to the output part 103 through each vertical signal line. Although the illustration is omitted in FIG. 1, the same applies to the third to eighth rows. In the following description, when specific row or column is not specified, a row direction is represented by n (n is an integer of 1 to 9) and a column direction is represented by m (m is an integer of 1 to 9).

Moreover, in the pixel part 102, three timing signals (FDRST (1), SEL (1) and TX (1)) are input from the timing control part 104 to the 9 pixels from the pixel px (1, 1) to the pixel px (1, 9) in the first row, and signals photoelectrically converted in the 9 pixels in the first row are read into the vertical signal lines (VLINE (1) to VLINE (9)) arranged in individual columns. Likewise, in 9 pixels from a pixel px (2, 1) to a pixel px (2, 9) in the second row, signals photoelectrically converted in the individual pixels are read through timing signals (FDRST (2), SEL (2) and TX (2)) by the vertical signal lines (VLINE (1) to VLINE (9)) arranged in individual columns, and, in 9 pixels from a pixel px (9, 1) to a pixel px (9, 9) in the ninth row, signals photoelectrically converted in the individual pixels are read through timing signals (FDRST (9), SEL (9) and TX (9)) by the vertical signal lines (VLINE (1) to VLINE (9)) arranged in individual columns. Although the illustration is omitted in FIG. 1, the same applies to the third to eighth rows.

The output part 103 is a block for outputting, in order of the columns, to the outside, the signals of the individual pixels read from the pixel part 102 in individual rows. In FIG. 1, the output part 103 includes a constant current circuit that supplies a constant current necessary for each vertical signal line VLINE (m) to read the signal, a column amplifier CAMP (m), a signal holding part 105 and an output amplifier OAMP.

The constant current circuit includes constant current transistors (Ti11 to Ti91) provided for the vertical signal lines (VLINE (1) to VLINE (9)) and a transistor Tib1 that feeds the constant current by a constant current source PW1 connected to a power supply Vdd. Here, the constant current transistors (Ti11 to Ti91) and the transistor Tib1 form a current mirror circuit. The constant current transistor of each column and an output transistor for each pixel, which will be described later, form a source follower circuit and supply the constant current necessary for each of the vertical signal lines (VLINE (1) to VLINE (9)) to read the signal from each pixel.

The column amplifier CAMP (m) performs amplification of the signal read into the vertical signal line VLINE (m) or the like. The operation of each column amplifier CAMP (m) is controlled by a column amplifier control signal fed from the timing control part 104. The column amplifier control signal is a control signal for varying, for example, the reset and the gain of the column amplifier.

The signal holding part 105 holds, for each row, the signal read from each pixel. Here, in order to remove variations in the pixels, the signal read from each pixel includes a non-exposed signal (Vdk) when a charge held in each pixel is reset and an exposed signal (Vsig) when a charge accumulated in each pixel according to the subject light is read. The non-exposed signal (Vdk) is held by a holding signal SHdk for non-exposed signal output by the timing control part 104; the exposed signal (Vsig) is held by a holding signal SHsig for the exposed signal output by the timing control part 104. Then, the non-exposed signal (Vdk) and the exposed signal (Vsig) held by the signal holding part 105 are read, for each column, according to horizontal scanning signals (H (1) to H (9)) output by the timing control part 104, to the side of the output amplifier OAMP.

Here, the operation of the signal holding part 105 will be described using the first column as an example. The non-exposed signal read from the pixel part 102 by the vertical signal line VLINE (1) in the first column is input through the column amplifier CAMP (1) to transistors Th11 and Th12. The transistor Th11 is turned on by the holding signal SHdk for non-exposed signal, and is held by a capacitor Ctd (1) for non-exposed signal. Here, at this time, the transistor Th12 is off. Then, the exposed signal read in the pixel part 102 by the vertical signal line VLINE (1) is input through the column amplifier CAMP (1) to the transistors Th11 and Th12. Then, the transistor Th12 is turned on by the holding signal SHsig for the exposed signal, and is held by a capacitor Cts (1) for exposed signal. Note that, at this time, the transistor Th11 is off. In this way, the non-exposed signal (Vdk) is held by the capacitor Ctd (1) for non-exposed signal, and the exposed signal (Vsig) is held by the capacitor Cts (1) for exposed signal. Likewise, in the second column, the non-exposed signal read in the pixel part 102 by the vertical signal line VLINE (2) is held through the transistor Th21 by a capacitor Ctd (2) for non-exposed signal, and the exposed signal is held through the transistor Th22 by a capacitor Cts (2) for exposed signal. In the ninth column, the non-exposed signal read in the pixel part 102 by the vertical signal line VLINE (9) is held through a transistor Th91 by a capacitor Ctd (9) for non-exposed signal, and the exposed signal is held through a transistor Th92 by a capacitor Cts (9) for exposed signal. Although the illustration is omitted in FIG. 1, the same applies to the third to eighth columns. In this way, the non-exposed signal (Vdk) is held by the capacitor Ctd (m) for non-exposed signal, and the exposed signal (Vsig) is held by the capacitor Cts (m) for exposed signal.

The output amplifier OAMP subtracts, from the exposed signal (Vsig) read from the signal holding part 105 for each pixel in each column, the non-exposed signal (Vdk) of the same pixel, and outputs an output signal Vout to the outside. Here, the signal holding part 105 and the output amplifier OAMP form a correlative double sampling circuit to remove noise caused by variations in the pixels.

Next, the timing control part 104 is a block that supplies the timing signals to the pixel part 102 of the solid state image sensor 101 and the output part 103. The timing signal for the pixel part 102 corresponds to, for example, an exposure start signal for providing an exposure start timing of each pixel, a reading signal for providing a timing for reading a signal from each pixel and the like. These signals are generated by combination of the timing signals (FDRST (n), SEL (n) and TX (n)) of each row of the pixel part 102. The timing signal for the output part 103 includes, for example, the holding signals (SHdk and SHsig) for holding, in the signal holding part 105, the signals of a row read from the pixel part 102 for each column, the horizontal scanning signals (H (1) to H (9)) for reading, in order of the columns, the signals of a row held by the signal holding part 105. Furthermore, the timing control part 104 outputs the column amplifier control signal for controlling each column amplifier CAMP (m). The column amplifier control signal has, for example, a plurality of control signals, and includes a column amplifier reset signal CArst that initially resets each column amplifier CAMP (m) and a gain control signal GAIN for changing the gain and the like.

[Example of Configuration of Pixel px (n, m)]

Figure 2:
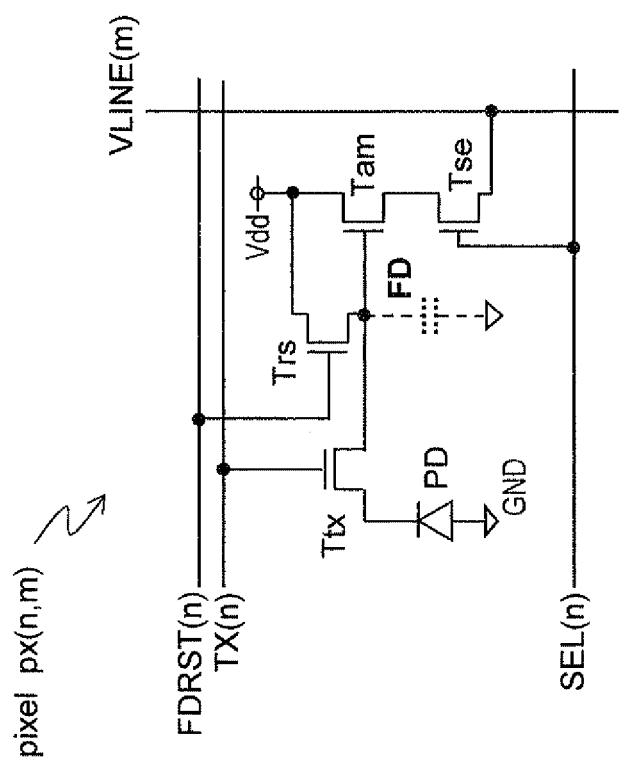
FIG. 2 is a diagram showing an example of the circuit of a pixel px (n, m)

An example of the configuration of each pixel px (n, m) of the pixel part 102 shown in FIG. 1 will now be described with reference to FIG. 2. In FIG. 2, the pixel px (n, m) includes a photodiode PD, a transfer transistor Ttx, an amplification transistor Tam that forms a pixel amplifier, a selection transistor Tse and a reset transistor Trs. Symbol FD represents a floating diffusion region to which the drain of the transfer transistor Ttx, the source of the reset transistor Trs and the gate of the amplification transistor Tam are connected; symbol Vdd represents a power supply; symbol GND represents a ground. Timing signals, namely, an FD reset signal FDRST (n) which resets a charge accumulated in the FD region, a transfer signal TX (n) and a selection signal SEL (n) are fed to the pixel px (n, m) from the timing control part 104 of FIG. 1.

In FIG. 2, the photodiode PD accumulates a charge according to the amount of subject light. When the transfer signal TX (n) is input to the gate of the transfer transistor Ttx, the charge accumulated in the photodiode PD is transferred to the FD region. The FD region is a region that forms a capacitance to the ground GDN; the charge transferred from the photodiode PD is held in the FD region. Then, when the selection signal SEL (n) is input to the gate of the selection transistor Tse, the charge held in the FD region is converted into an electric signal by the amplification transistor Tam; the electric signal is read into the vertical signal line VLINE (m) through the selection transistor Tse.

As described above, the signal of each pixel of the pixel part 102 is read into the vertical signal line VLINE (m) of each column through the timing signals output by the timing control part 104.

Here, as described above, in the solid state image sensor 101 according to the present embodiment, when shooting is performed with the rolling shutter method, the two modes, the "normal shooting mode" and the "high SN shooting mode," can be selected. An operation at the time of the rolling shutter in each shooting mode will now be described in detail.

[Operation in "Normal Shooting Mode"]

Figure 3:
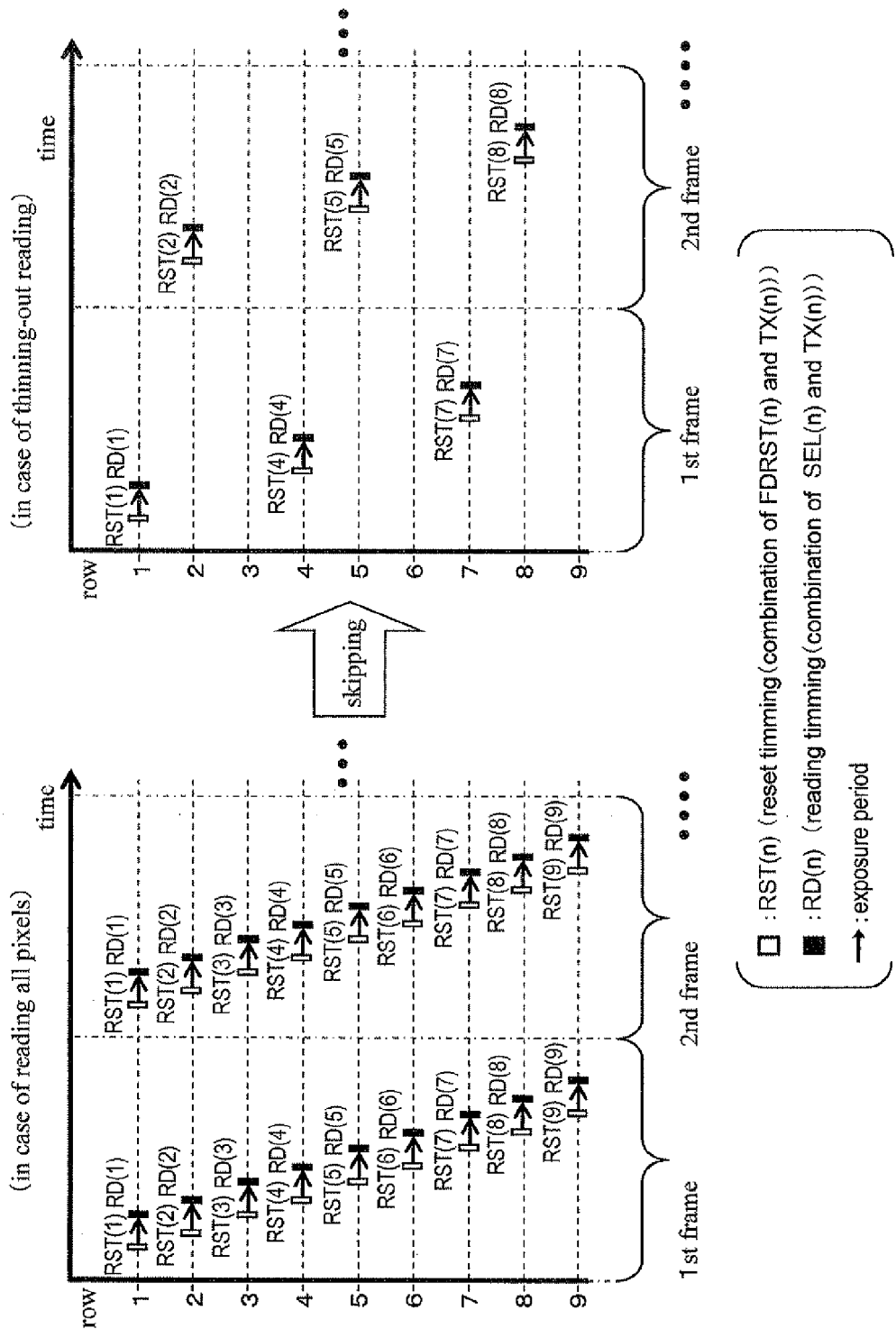
FIG. 3 is a diagram showing an example of the timing of a "normal shooting mode."

In the "normal shooting mode," the rolling shutter can be performed in a period in which the exposure time for each row is shorter than one frame. FIG. 3 is a diagram showing an example of timings when signals are read from all pixels in all rows and columns in the "normal shooting mode" of the solid state image sensor 101. FIG. 3 shows the example of timings when all row reading and thinning-out reading are performed with the rolling shutter method; for facilitating understanding of the relationship between the exposure start timing and the exposure completion timing of each row, in FIG. 3, only the exposure start timing (reset timing RST (n)) and the exposure completion timing (reading timing RD (n)) are extracted and shown. Here, timings represented by white rectangular marks indicate the exposure start timing RST (n), and timings represented by black rectangular marks indicate the exposure completion timing (reading timing RD (n)). Arrows indicate exposure periods. As described above, in the rolling shutter method, the row which is reset and the row which is read are different; for example, in the all row reading shown in FIG. 3, while the first row is being read, the third row is reset whereas, while the second row is being read, the fourth row is rest. In this way, the first to ninth rows are read per frame period; the exposure period is shorter than one frame period. The example of the timings of the thinning-out reading of FIG. 3 shows that, in the first frame, signals are read from pixels in the first, fourth and seventh rows, in the second frame, signals are read from pixels in the second, fifth and eighth rows and, in the third frame, signals are read from pixels in the third, sixth and ninth rows. As described above, in the "normal shooting mode," even when the thinning-out reading is performed, it is impossible to perform exposure for a period of time longer than one frame period.

Figure 4:
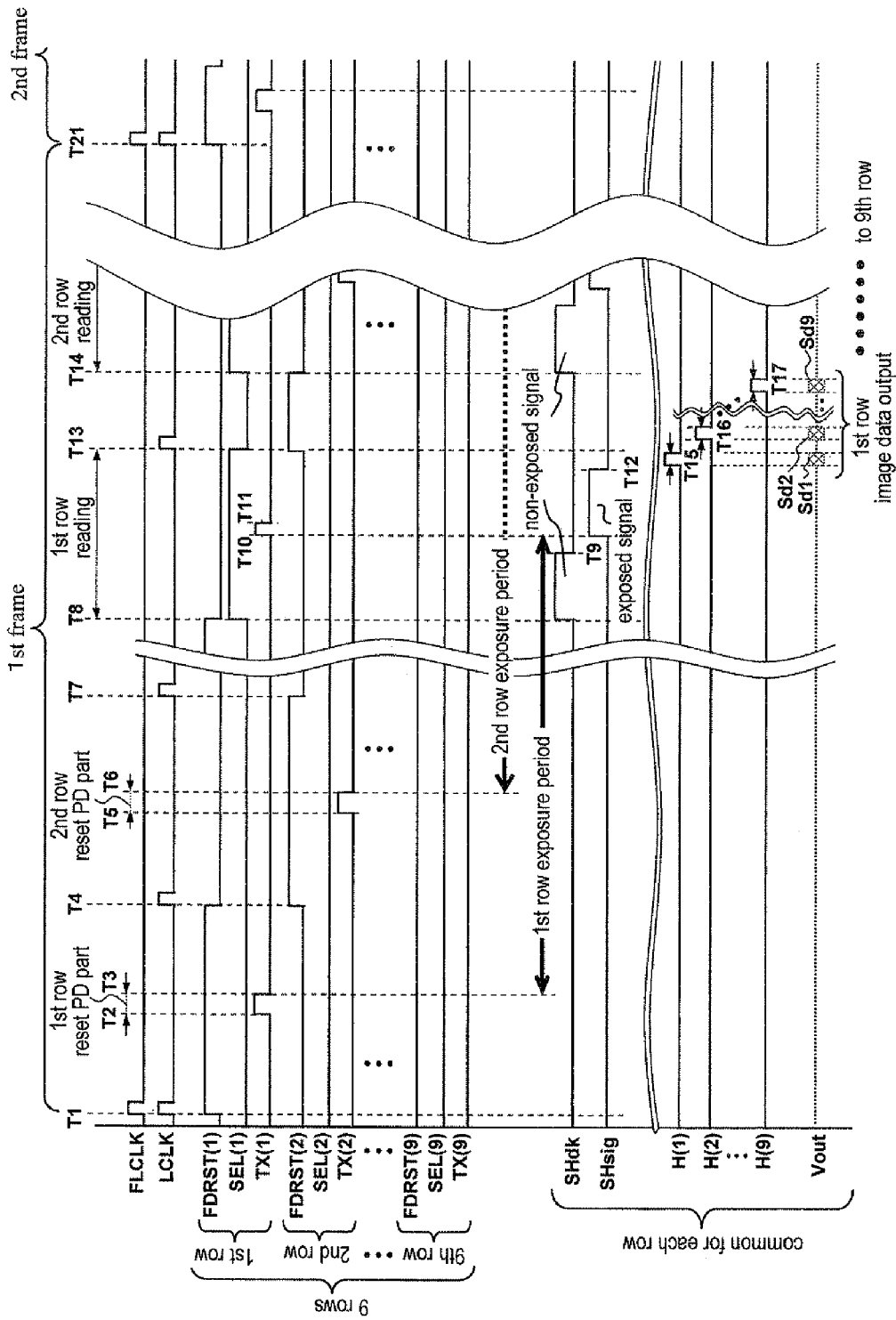
FIG. 4 is a timing chart of the "normal shooting mode."

FIG. 4 is a timing chart showing, in detail, the operations of the exposure start timing (reset timing RST (n)) and the exposure completion timing (reading timing RD (n)). FIG. 4 shows a case where, with the rolling shutter method, a plurality of frames is shot at a predetermined frame rate (for example, 30 frames/second), and also shows a case where all pixels (all 81 pixels of 9 rows by 9 columns in the present example) of the pixel part 102 are read for each frame. In FIG. 4, timing signals of the same symbols as in FIG. 1 indicate the same timing signals as in FIG. 1.

In FIG. 4, a frame clock FCLK is a signal showing a timing for each one frame, and a row clock LCLK is a signal showing a timing for each row within one frame. Here, the frame clock FCLK and the row clock LCLK may be supplied from the outside of the solid state image sensor 101 as part of the operation control signal or may be generated by the timing control part 104 from clock signal or the like of the operation control signal supplied from the outside.

In FIG. 4, a period (from a timing T1 to a timing T21) indicated by the frame clock FCLK corresponds to the first frame. In the following description, it is assumed that the high level of each signal is an on-state (a state where the signal functions) and the low level is an off-state (a state where the signal does not function).

First, in the period from the timing T1 to the timing T4, an FD reset signal FDRST (1) in the first row is turned on. In the operation here, the FDRST (1) signal is fed to the gate of the reset transistor Trs as (n=1, m=1) in FIG. 2, and the charge in the FD region of the pixel px (1, 1) is reset. Then, in the period from the timing T2 to the timing T3 while the charge in the FD region is being reset, the transfer signal TX (1) in the first row is turned on. In the operation here, the TX (1) signal is fed to the gate of the transfer transistor Ttx as (n=1, m=1) in FIG. 2, and the charge accumulated in the photodiode PD is transferred to the FD region and is reset. Then, the accumulation of the charge into the photodiode PD is started (the start of the exposure period for the first row) from the timing T3 when the transfer signal TX (1) is turned off.

Note that, the same applies to the pixels from the pixel px (1, 2) to the pixel px (1, 9) in the other columns of the same first row.

Here, the logical AND of the ED reset signal FDRST (1) and the transfer signal TX (1) corresponds to an exposure start signal, and provides the exposure start timing for the first row.

Likewise, in the period from the timing T4 to the timing T7, an FD reset signal FDRST (2) in the second row is turned on, and the charge in the ED region of the pixel px (2, m) is reset. Then, in the period from the timing T5 to the timing T6 while the charge in the ED region is being reset, the transfer signal TX (2) in the second row is turned on, and the charge accumulated in the photodiode PD is transferred to the ED region and is reset. Then, the accumulation of the charge in the photodiode PD is started (the start of the exposure period for the second row) from the timing T6 when the transfer signal TX (2) is turned off.

As described above, the charges in the photodiodes PD in the first to ninth rows are reset, and the exposure period is started in each of the rows.

On the other hand, along with the operation of starting the exposure period, an operation of converting the charge accumulated in the photodiode PD into an electric signal and reading it is performed for each row. For example, in the period from the timing T8 to the timing T13, the selection signal SEL (1) is turned on, and the charge in the FD region of each pixel of the first row is read into the vertical signal line VLINE (m) of each column. Since, at this point, the FD region is reset in the period from the timing T7 to the timing T8, the charge is read, as the non-exposed signal, through the amplification transistor Tam and the selection transistor Tse, into each vertical signal line VLINE (m).

In contrast, in the period from the timing T8 to the timing T9, the holding signal SHdk of the non-exposed signal is turned on, and the non-exposed signal read into each vertical signal line VLINE (m) is held in the capacitor Ctd (m) for non-exposed signal of each column in the signal holding part 105.

In the subsequent period from the timing T10 to the timing T11, when the transfer signal TX (1) is turned on, the charge accumulated in the photodiode PD of each pixel of the first row is transferred to the ED region. At this point, the exposure period for the first row is completed. Since, at this point, the selection signal SEL (1) is on, the charge transferred to the FD region of each pixel of the first row is read, as the exposed signal, through the amplification transistor Tam and the selection transistor Tse, into each vertical signal line VLINE (m).

On the other hand, in the period from the timing T10 to the timing T12, the holding signal SHsig of the exposed signal is turned on, and the exposed signal of each pixel of the first row read into each vertical signal line VLINE (m) is held in the capacitor Cts (m) for exposed signal of each column in the signal holding part 105.

Likewise, for each pixel of the second row of the first frame, at the timing T14 and the subsequent timings, the non-exposed signal and the exposed signal are read. Then, the non-exposed signal read from each pixel of the second row is held in the capacitor Ctd (m) for non-exposed signal of each column, and the exposed signal is held in the capacitor Cts (m) for exposed signal of each column. In FIG. 4 and the third to eighth rows that are omitted in FIG. 4, likewise, the non-exposed signal read from each pixel is held in the capacitor Ctd (m) for non-exposed signal of each column, and the exposed signal is held in the capacitor Cts (m) for exposed signal of each column. As described above, for each row, the non-exposed signal and the exposed signal are read from the pixel of each column, and are held in the capacitor Ctd (m) for non-exposed signal and the capacitor Cts (m) for exposed signal of the signal holding part 105, respectively.

Next, a timing when the signals held, for each row, in the capacitor Ctd (m) for non-exposed signal and the capacitor Cts (m) for exposed signal of the signal holding part 105 are output to the outside of the solid state image sensor 101 will now be described. At the timing chart of FIG. 4, the non-exposed signal and the exposed signal held, for each row, in the capacitor Ctd (m) for non-exposed signal and the capacitor Cts (m) for exposed signal of the signal holding part 105 are output, for each column, to the outside according to the timing of the horizontal scanning signals (H (1) to H (9)).

First, in the period of the timing T15 of FIG. 4, the horizontal scanning signal H (1) of the timing control part 104 is turned on. Thus, transistors Ta11 and Ta12 in the first column of the signal holding part 105 are turned on, and the non-exposed signal (Vdk) held in the capacitor Ctd (1) for non-exposed signal and the exposed signal (Vsig) held in the capacitor Cts (1) for exposed signal are input to the output amplifier OAMP. Since the output amplifier OAMP is a differential amplifier, the output amplifier OAMP outputs, to the outside, the output signal Vout obtained by subtracting the non-exposed signal (Vdk) from the exposed signal (Vsig). Here, in FIG. 4, the output signal Vout output from the output amplifier OAMP in the period during which the horizontal scanning signal H (1) is on is a signal Sd1 of the pixel px (1, 1) in the first column of the first row.

Then, in the period of the subsequent timing T16, the horizontal scanning signal H (2) of the timing control part 104 is turned on. Thus, transistors Ta21 and Ta22 in the second column of the signal holding part 105 are turned on, and the non-exposed signal (Vdk) held in the capacitor Ctd (2) for non-exposed signal and the exposed signal (Vsig) held in the capacitor Qs (2) for exposed signal are input to the output amplifier OAMP. Then, the output signal Vout obtained by subtracting the non-exposed signal (Vdk) from the exposed signal (Vsig) is output to the outside. In FIG. 4, the output signal Vout in the period during which the horizontal scanning signal H (2) is on is a signal Sd2 of the pixel px (1, 2) in the second column of the first row.

Likewise, in the period of the subsequent timing T17, the horizontal scanning signal H (9) of the timing control part 104 is turned on. Thus, transistors Ta91 and Ta92 in the ninth column of the signal holding part 105 are turned on, and the non-exposed signal (Vdk) held in the capacitor Ctd (9) for non-exposed signal and the exposed signal (Vsig) held in the capacitor Cts (9) for exposed signal are input to the output amplifier OAMP. Then, the output signal Vout obtained by subtracting the non-exposed signal (Vdk) from the exposed signal (Vsig) is output to the outside. In FIG. 4, the output signal Vout in the period during which the horizontal scanning signal H (9) is on is a signal Sd9 of the pixel px (1, 9) in the ninth column of the first row.

Note that, although not shown in FIG. 4, with respect to the individual pixels (px (1, 3) to px (1, 8)) from the third column of the first row to the eighth column of the first row, the signals of the individual pixels are likewise output from the output amplifier OAMP.

Likewise, in the second to ninth rows of the first frame, the signals of all pixels are also read from the solid state image sensor 101 to the outside. At the second frame subsequent to the timing T21, as in the first frame, the signals of all pixels are also read.

As described above with reference to the timing chart of FIG. 4, in the rolling shutter in which the signals are read from all pixels of the solid state image sensor 101, the reset operation of resetting the charge in the photodiode PD and the charge in the FD region, the exposure period and the signal reading operation are performed sequentially for each row, and the operation within one frame period is performed.

Note that, although the timing chart of FIG. 4 shows the timing when signals are read from all pixels of the pixel part 102 in one frame period, even when the thinning-out reading is performed, the timing signals (FDRST (n), SEL (n) and TX (n)) corresponding to the row to be read are output at the same timing as described above. For example, when two rows are thinned out in one frame period, and the first row, the fourth row and the seventh row are read, in the timing chart of FIG. 4, the timing signals (FDRST (1), SEL (1) and TX (1)) corresponding to the first row, the timing signals (FDRST (4), SEL (4) and TX (4)) corresponding to the fourth row and the timing signals (FDRST (7), SEL (7) and TX (7)) corresponding to the seventh row are simply output from the timing control part 104 to the pixel part 102 in one frame period; within one frame period, the reset operation, the exposure period and the signal reading operation are likewise performed sequentially for each of the rows (the first row, the fourth row and the seventh row).

When the rows to be thinned out are changed for each frame, the reading operation is performed, for example, in the first row, the fourth row and the seventh row of the first frame, in the second row, the fifth row and the eighth row of the second frame, in the third row, the sixth row and the ninth row of the third frame and in the first row, the fourth row and the seventh row of the fourth frame. Even in this case, within one frame period, the reset operation, the exposure period and the signal reading operation are performed sequentially for each of the rows. Hence, when in the timing chart of FIG. 4, the solid state image sensor 101 is operated to perform shooting, the exposure period for each row is limited, at the maximum, to less than one frame period. An operation of the "high SN shooting mode" in the solid state image sensor 101 according to the present embodiment will now be described.

[Operation in "High SN Shooting Mode"]

When the operation in the "high SN shooting mode" is instructed to the timing control part 104 from the outside of the solid state image sensor 101, the timing control part 104 outputs the timing signals corresponding to the "high SN shooting mode" to the pixel part 102 and the output part 103.

Figure 5:
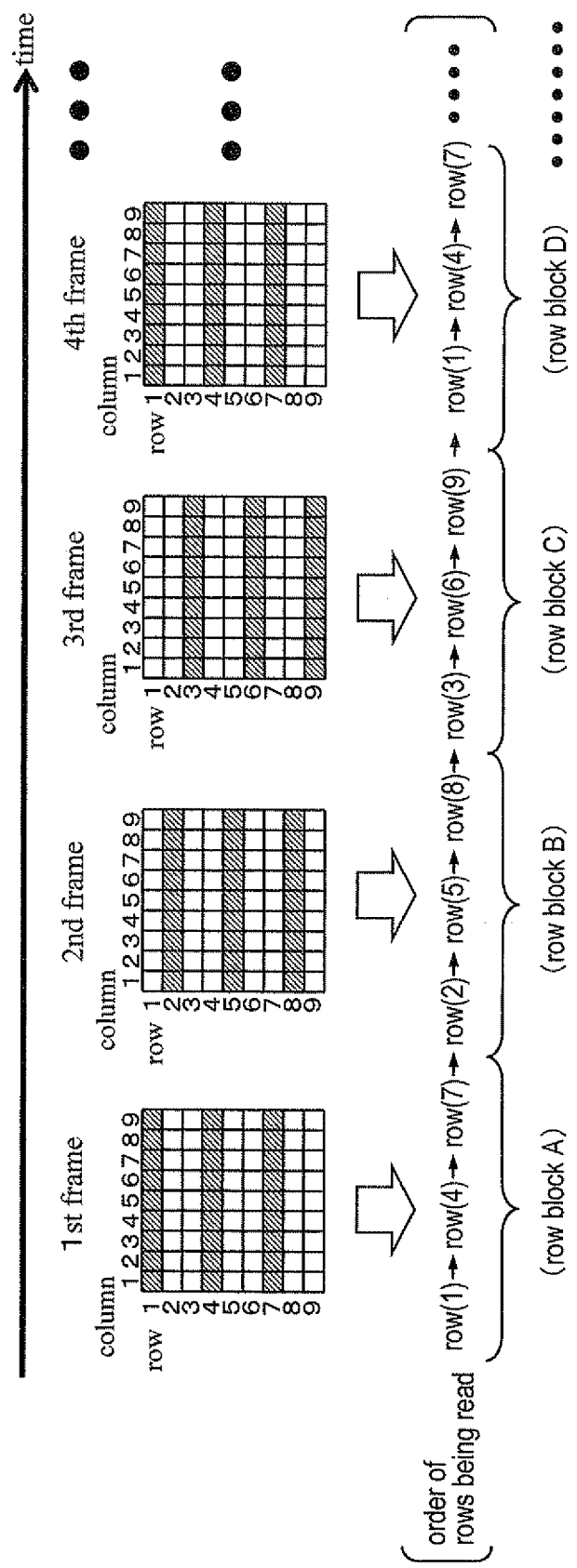
FIG. 5 is a diagram showing an example of row blocks.

Here, in the "high SN shooting mode," the rolling shutter in which the exposure time for each row is longer than one frame period can be performed. Thus, it is possible to shoot an image having a satisfactory SN ratio and a high quality even at a dark place or the like. In the "high SN shooting mode," the rolling shutter is performed by the solid state image sensor 101 on the precondition that thinning out is performed. In particular, when a combination of rows where thinning out is performed is assumed to be a row block, division into a plurality of row blocks is performed, and the exposure timing is controlled for each block. How this operation is performed is shown in FIG. 5. FIG. 5 shows an example of a case where two rows are thinned out and a row block is formed every three rows. For example, in FIG. 5, a row block A includes the first row, the fourth row and the seventh row, a row block B includes the second row, the fifth row and the eighth row and a row block C includes the third row, the sixth row and the ninth row. Then, the (3k-2)th frame reads the row block A, the (3k-1)th frame reads the row block B and the (3k)th frame reads the row block C. Here, k is an integer of one or more. For example, in FIG. 5, the first frame reads the row block A, the second frame reads the row block B, the third frame reads the row block C and the fourth frame reads again the row block A, and, in the subsequent frames, the operation is repeatedly performed while the row block to be read is being changed sequentially. When it is assumed that a thinning-out row number is p (p is an integer of one or more) and a row block number is q (q is an integer of one or more), the relationship between both numbers is expressed as (q≤p+1). For example, in the case of FIG. 5, since the thinning-out row number P=2, preferably, the row block number q≤3. Although, in the example of FIG. 5, the three blocks, that is, the row blocks A, B and C are cyclically used for each frame, even when the thinning-out row number P=2, the two blocks, that is, the row blocks A and B may be cyclically used for each frame.

An operation of the solid state image sensor 101 according to the present embodiment when the exposure period is set at one frame period or more will now be described with reference to the timing chart of FIG. 6. The timing chart of FIG. 6 shows a case where, with the rolling shutter method, a plurality of frames is shot at a predetermined frame rate (for example, 30 frames/second), and also shows a case where thinning out is performed from the pixel part 102 and a different row is read for each frame.

Figure 6:
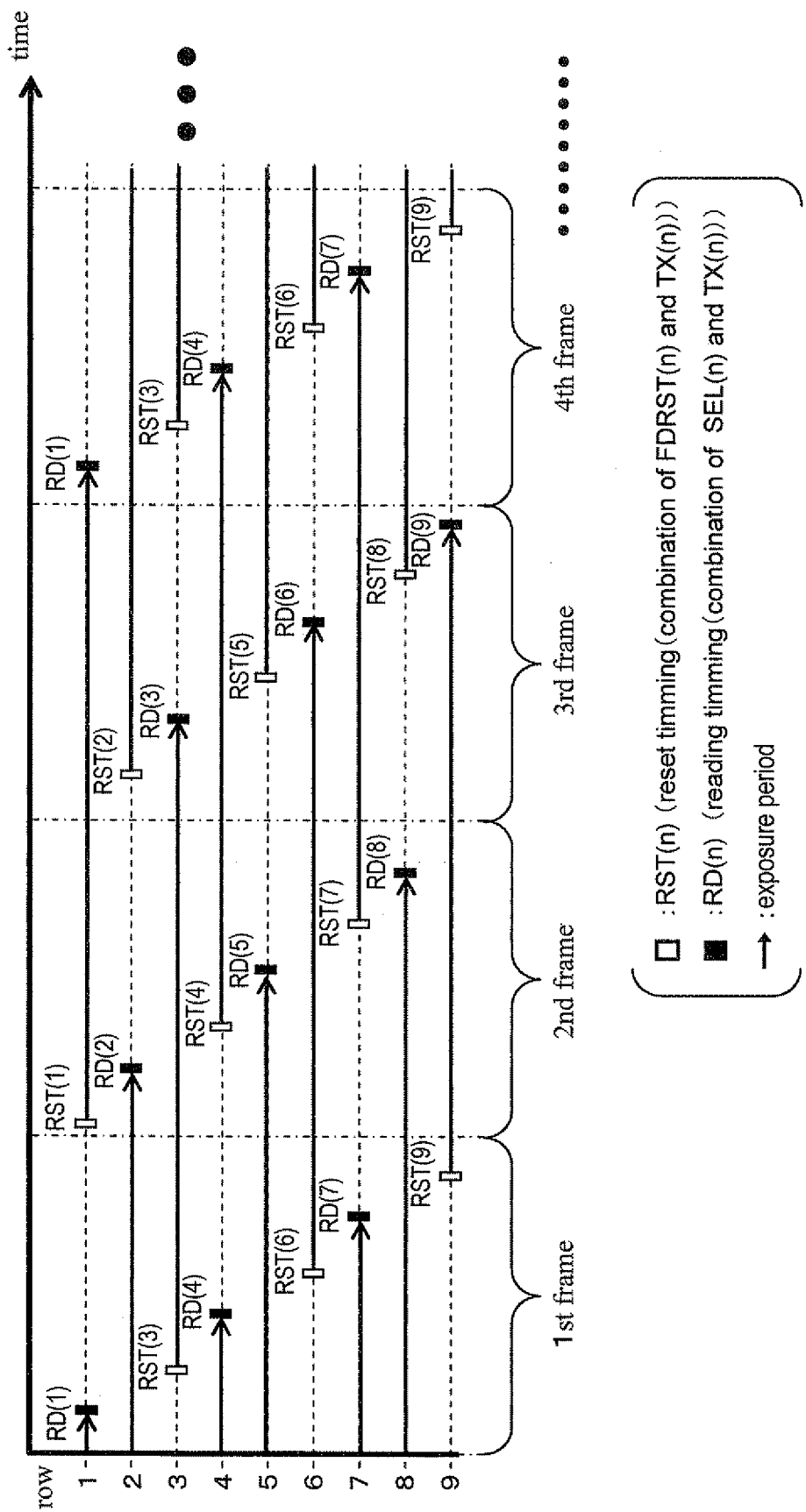
FIG. 6 is a diagram showing an example of the timing of a long exposure.

Here, for facilitating understanding of the relationship between the exposure start timing and the exposure completion timing for each row and each frame in the "high SN shooting mode," FIG. 6 shows only the exposure start timing (reset timing RST (n)) and the exposure completion timing (reading timing RD (n)). In FIG. 6, the horizontal axis represents time, and the vertical axis represents individual nine rows. The timings represented by white rectangular marks indicate the exposure start timing RST (n), and the timings represented by black rectangular marks indicate the exposure completion timing (reading timing RD (n)). Although, in FIG. 6, for facilitating understanding, the exposure completion timing and the reading timing are the same, the actual reading timing includes, as described with reference to FIG. 7, the non-exposed signal, the exposed signal, horizontal output timing and the like, and the time point of the timing T36 of FIG. 7 corresponds to the exposure completion timing of FIG. 6. Hence, an arrow connecting the white rectangular mark and the black rectangular mark represents the exposure period.

The reading timing for each row block will first be described with reference to FIG. 6. In FIG. 6, in the first frame, signals are read chronologically from the pixels of the first, the fourth and seventh rows corresponding to the row block A to form the image of the first frame. In the second frame, signals are read chronologically from the pixels of the second, the fifth and the eighth rows corresponding to the row block B to form the image of the second frame. In the third frame, signals are read chronologically from the pixels of the third, the sixth and the ninth rows corresponding to the row block C to form the image of the third frame. In the fourth frame, signals are read chronologically from the pixels of the first, the fourth and the fifth rows corresponding again to the row block A to form the image of the fourth frame. In the subsequent frames, signals are likewise read from the pixels of each row block.

The exposure start timing (reset timing) for each row block will now be described with reference to FIG. 6. This reset timing is not identical to the FD reset signal FDRST (n) itself of FIG. 1, is a timing that is generated by combination of the FD reset signal FDRST (n) and the transfer signal TX (n) and is a timing for resetting the charge in the photodiode PD to start a new round of exposure. The specific operation timing corresponds, as at the timing T1 and the timing T2 of FIG. 4, to an operation of simultaneously turning on the FD reset signal FDRST (n) and the transfer signal TX which transfers the charge in the photodiode PD to the FD region. Thus, the charge in the photodiode PD is read and is cleared (reset) together with the charge in the FD region.

In FIG. 6, at the exposure start timing (reset timing) for each row block, in the first frame, the charge in the photodiode PD of each pixel of the third, sixth and ninth rows corresponding to the row block C is reset. In the second frame, the charge in the photodiode PD of each pixel of the first, fourth and seventh rows corresponding to the row block A is reset. In the third frame, the charge in the photodiode PD of each pixel of the second, fifth and eighth rows corresponding to the row block B is reset. In the fourth frame, the charge in the photodiode PD of each pixel of the third, sixth and ninth rows corresponding again to the row block C is reset. In the subsequent frames, the charge in the photodiode PD of each pixel of each row block is likewise reset.

Here, in the example of FIG. 6, when the signal of each pixel of the first, fourth and seventh rows in the first frame is read, it is assumed that, at a timing ahead of the first frame, the exposure start operation (the operation of resetting the charge in the photodiode PD and the charge in the FD region) for the row block A is already performed. Likewise, when the signal of each pixel of the second, fifth and eighth rows in the second frame is read, it is assumed that, at a timing ahead of the second frame, the exposure start operation (the operation of resetting the charge in the photodiode PD and the charge in the FD region) for the row block B is already performed. When the solid state image sensor 101 is actually mounted in a camera and images of a plurality of successive frames are shot, the first two frames output by the solid state image sensor 101 need to be treated as discarded frames.

As described above, the timing when the charge in the photodiode PD and the charge in the FD region are reset and the exposure is started is switched, for each frame, like the row block A->the row block B->the row block C->the row block A->the row block B-> . . . . On the other hand, the timing when the charge accumulated in the photodiode PD is read is also switched, for each frame, like the row block A->the row block B->the row block C->the row block A->the row block B-> . . . . As shown in FIG. 6, however, in the "high SN shooting mode," the exposure start timing (the timing when the charge in the photodiode PD and the charge in the FD region are reset) and the reading timing (the timing when the charge accumulated in the photodiode PD is read) for the same row block are not performed within the same frame period. For example, although, in the first frame, the row block C is reset, the row block C is not read. Although, in the first frame, the row block A is read, the row block A is not reset. Likewise, in the second frame, the reset operation is performed on the row block A alone, and the reading operation is performed on the row block B alone. In the third frame, the reset operation is performed on the row block B alone, and the reading operation is performed on the row block C alone. As described above, in the "high SN shooting mode," the reset operation and the reading operation for the same row block are performed in different frames, and the individual row blocks are cyclically performed at the same operation intervals (the same exposure time). For example, in the case of FIG. 6, three states, that is, the state where the row block A performs the reset operation and the row block B performs the reading operation, the state where, in the subsequent frame, the row block B performs the reset operation and the row block C performs the reading operation and the state where, in the subsequent frame, the row block C performs the reset operation and the row block A performs the reading operation, are cyclically performed for each frame. The "high SN shooting mode" significantly differs in this point from the case, described in the "normal shooting mode," where the thinning-out reading is performed in the timing chart of FIG. 4. As described previously, when the two-row thinning-out reading is performed in the timing chart of FIG. 4, though an exposure period shorter than one frame period is only obtained, in the timing chart of FIG. 6, an exposure period longer than one frame period is obtained. Thus, even when shooting is performed in a dark place or the like, it is possible to obtain an image having little noise and a high SN ratio.

Figure 7:
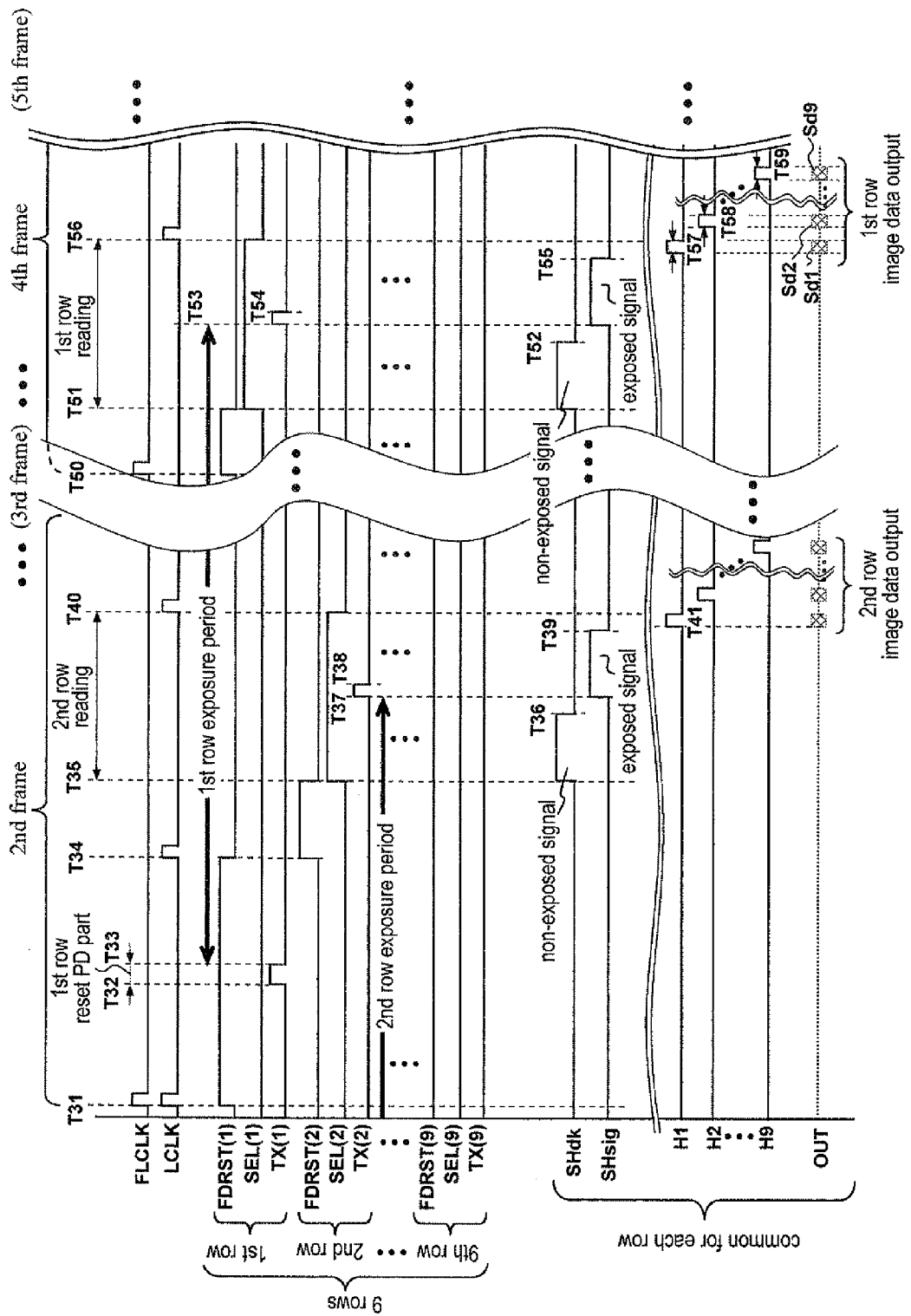
FIG. 7 is a timing chart of a "high SN shooting mode."

The detailed timing chart of the "high SN shooting mode" described with reference to FIG. 6 will now be described with reference to FIG. 7. The timing chart of FIG. 7 is a diagram that corresponds to the timing chart of FIG. 4 in the "normal shooting mode," shows a case where, with the rolling shutter method, a plurality of frames is shot at a predetermined frame rate (for example, 30 frames/second) and also shows an example of a case where the thinning out is performed from the pixel part 102 and a different row block is read for each frame. Timing signals In FIG. 7 and the timing signals in FIGS. 1 and 4 of the same symbols are the same. For example, the frame clock FCLK is a signal that indicates a timing for each one frame, and the row clock LCLK a signal that indicates a timing for each row within one frame.

Here, FIG. 7 is a timing chart that mainly shows, for facilitating understanding of the exposure period for the first row, the frames from the second frame (the exposure start timing of the first row) to the fourth frame (the exposure completion timing of the first row) of FIG. 6, which are the timing of the exposure start timing of the first row.

First, as in the period from the timing T1 to the timing T4 of FIG. 4, in the period from the timing T31 to the timing T34 of the second frame of FIG. 7, the FD reset signal FDRST (1) of the first row is fed to the gate of the reset transistor Trs, and the charge in the FD region of the pixel px (1, 1) is reset. Then, in the period from the timing T32 to the timing T33 while the charge in the FD region is being reset, the transfer signal TX (1) in the first row is turned on. In the operation here, the TX (1) signal is fed to the gate of the transfer transistor Ttx as (n=1, m=1) in FIG. 2, and the charge accumulated in the photodiode PD is transferred to the FD region and is reset. Then, the accumulation of the charge in the photodiode PD is started (the start of the exposure period for the first row) from the timing Tb1 when the transfer signal TX (1) is turned off. The same applies to the pixels from the pixel px (1, 2) to the pixel px (1, 9) in the other columns of the same first row.

Here, the logical AND of the FD reset signal FDRST (1) and the transfer signal TX (1) corresponds to an exposure start signal, and provides the exposure start timing for the first row. Although the operation until the timing T34 when the exposure for the first row is started is the same as in the case of FIG. 4, since in the remaining periods of the second frame and all periods of the third frame, the selection signal SEL (1) and the transfer signal TX (1) of the first row are not turned on, the signal of each pixel of the first row is not read in the second frame and the third framed. Then, in the period of the fourth frame, the FD reset signal FDRST (1) is turned on in the period from the timing T50 to the timing T51, and the charge in the FD region of each pixel of the first row is reset. After the charge in the FD region is reset in the period from the timing T31 to the timing T34, since the charge is not transferred to the FD region, the FD reset signal FDRST (1) may not be turned on in the period from the timing T50 to the timing T51. A leak of the charge from the photodiode PD or the other may cause the charge of a noise component to be held in the FD region, and thus it is appropriate to reset the charge in the FD region immediately before the charge in the photodiode PD is read.

Then, in the period from the timing T51 to the timing T56, the selection signal SEL (1) is turned on, and the charge in the FD region of each pixel of the first row is read into the vertical signal line VLINE (m) of each column. At this point, since the FD region is reset in the period from the timing T50 to the timing T51, the signal read into each vertical signal line VLINE (m) is the non-exposed signal.

On the other hand, in the period from the timing T51 to the timing T52, the holding signal SHdk of the non-exposed signal is turned on, and the non-exposed signal read into each vertical signal line VLINE (m) is held in the capacitor Ctd (m) for non-exposed signal of each column in the signal holding part 105.

In the subsequent period from the timing T53 to the timing T54, when the transfer signal TX (1) is turned on, the charge accumulated in the photodiode PD of each pixel of the first row is transferred to the FD region. At this point, the exposure period for the first row that is started at the timing T33 in the previous second frame is completed. Since the selection signal SEL (1) is on, the charge transferred to the FD region of each pixel of the first row is read, as the exposed signal, through the amplification transistor Tam and the selection transistor Tse into each vertical signal line VLINE (m).

On the other hand, in the period from the timing T53 to the timing T55, the holding signal SHsig of the exposed signal is turned on, and the exposed signal of each pixel of the first row read into each vertical signal line VLINE (m) is held in the capacitor Cts (m) for exposed signal of each column in the signal holding part 105. The operation after the exposed signal and the non-exposed signal of each row are read by the signal holding part 105 is the same as in FIG. 4. For example, the non-exposed signal and the exposed signal of the first row held in the signal holding part 105 are sequentially read, for each column, to the side of the output amplifier OAMP according to the horizontal scanning signals H (1) to H (9) (such as the timings T57, T58 and T59 of FIG. 7) output by the timing control part 104. Then, the output amplifier OAMP outputs the output signal Vout obtained by subtracting the non-exposed signal from the exposed signal.

As in the first row, with respect to each pixel of the same row block A as the fourth and seventh rows where thinning-out reading is performed, in the second frame, the charge in the photodiode PD and the charge in the FD region are reset and the exposure is started, the exposure up to the fourth frame continues, and thereafter, the charge accumulated in the photodiode PD of each pixel of the fourth and seventh rows is transferred to the FD region (exposure completion) and is read, as the exposed signal, through the amplification transistor Tam and the selection transistor Tse into the vertical signal line VLINE (m) of each column. Then, the exposed signal is output to the outside through the signal holding part 105 and the output amplifier OAMP.

As described above, for each pixel of the first, fourth and seventh rows (the row block A), the exposure is started in the second frame, and the exposure is completed in the fourth frame, and thus it is possible to perform long time exposure over about two frame periods and obtain an image having a high SN ratio even when the image is shot in a dark place or the like.

Likewise, with respect to the signal of each pixel of the row block B of the second, fifth and eighth rows and the row block C of the third, sixth and ninth rows, the charge accumulated in the photodiode PD is read, as the exposed signal, with the long time exposure over about two frame periods.

For example, in FIG. 7, with respect to the signal of each pixel of the second row of the row block B, in the period from the timing T34 to the timing T35, the FD reset signal FDRST (2) is turned on, and the charge in the FD region of each pixel of the second row is reset. Then, in the subsequent period from the timing T35 to the timing T36, the holding signal SHdk of the non-exposed signal is turned on, and the non-exposed signal read into each vertical signal line VLINE (m) is held in the capacitor Ctd (m) for non-exposed signal of each column in the signal holding part 105. Then, when, at the subsequent timing T37, the transfer signal TX (1) is turned on, the charge accumulated in the photodiode PD of each pixel of the second row is transferred to the FD region, and the exposure period for the second row is completed. Since the selection signal SEL (2) is on at this point, the charge transferred to the FD region of each pixel of the second row is read, as the exposed signal, through the amplification transistor Tam and the selection transistor Tse into each vertical signal line VLINE (m).

On the other hand, in the period from the timing T37 to the timing T39, the holding signal SHsig of the exposed signal is turned on, and the exposed signal of each pixel of the second row read into each vertical signal line VLINE (m) is held in the capacitor Cts (m) for exposed signal of each column in the signal holding part 105. Then, at the timings subsequent to the timing T41, as in the first row, the non-exposed signal and the exposed signal of each pixel of the second row held in the signal holding part 105 are sequentially read, for each column, to the side of the output amplifier OAMP according to the horizontal scanning signals (from H (1) to H (9)). Then, the output amplifier OAMP outputs the output signal Vout obtained by subtracting the non-exposed signal from the exposed signal.

As described above, in the "high SN shooting mode," it is possible to make the exposure period for each row equal to or more than one frame period and obtain an image having a high SN ratio even when the image is shot in a dark place or the like.

(Second Embodiment)

An electronic camera 200 will now be described as a second embodiment of the image shooting device according to the present invention. The electronic camera 200 is an electronic camera that uses the solid state image sensor 101 compatible with the rolling shutter method described in the first embodiment.

Figure 8:
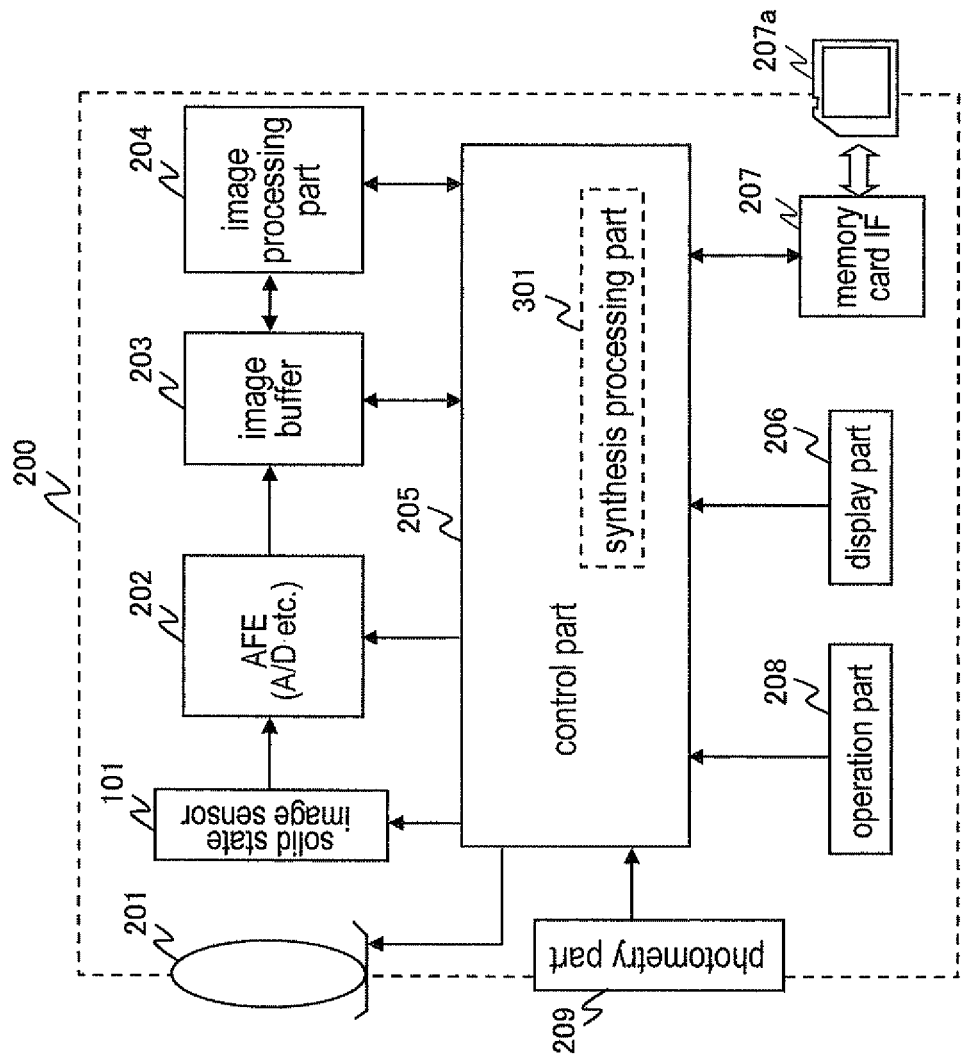
FIG. 8 is a diagram showing an example of the configuration of an electronic camera 200.

FIG. 8 is a block diagram showing the configuration of the electronic camera 200. In FIG. 8, the electronic camera 200 includes a shooting optical system 201, the solid state image sensor 101, an AFE (analog front end) 202, an image buffer 203, an image processing part 204, a control part 205, a display part 206, a memory card IF 207, an operation part 208 and a photometry part 209. The electronic camera 200, when performing shooting with the rolling shutter method, can select, with the operation part 208, three modes, namely, the "normal shooting mode," the "high SN shooting mode" and an "automatic SN shooting mode." In particular, in the "automatic SN shooting mode" of the electronic camera 200, at the time of shooting, it is possible to automatically switch, according to the photometric value of the photometry part 209, from the "normal shooting mode" which has an exposure time of less than one frame to the "high SN shooting mode" which can have an exposure time longer than one frame period, and thus it is possible to shoot an image having a satisfactory SN ratio in a place ranging from a bright place to a dark place. The individual parts of the electronic camera 200 will be sequentially described below.

The shooting optical system 201 includes a focus lens, a zoom lens, an aperture or a mechanical shutter, and the like; the control part 205 performs control on a focus position, a zoom position, an aperture value and the like, or the opening/closing of the mechanical shutter and the like. The subject light is incident through the shooting optical system 201, and forms an image on the light receiving surface of the solid state image sensor 101.

The solid state image sensor 101 is the same as that described in the first embodiment, and is compatible with the electronic shutter by the rolling shutter method.

The AFE 202 adjusts the level of the signal of each pixel output, for each row, sequentially from the solid state image sensor 101 according to a gain indicated from the control part 205. Then, the analog electric signal whose level has been adjusted is analog-to-digital-converted into digital data, and is taken in the image buffer 203. As for an image taken in the image buffer 203, the analog-to-digital-converted digital data for each pixel is collectively stored in a unit of image of one frame.

The image buffer 203 includes a volatile high-speed memory or the like; the image buffer 203 sequentially stores the digital data on a pixel by pixel basis output from the AFE 202 according to the timing output from the control part 205, and holds it as the image data of one frame. The image buffer 203 is also used as the processing buffer of the image processing part 204.

The image processing part 204 performs, on the image data taken in the image buffer 203, image processing (such as color correction processing, edge enhancement processing or JPEG compression processing), white balance processing or the like that is instructed by the control part 205.

The control part 205 includes a CPU that is operated according to a program code previously stored therein. The control part 205 controls the overall operation of the electronic camera 200 according to the operation of an operation member provided in the operation part 208. In particular, in the present embodiment, the control part 205 controls the operation of the solid state image sensor 101 according to the three modes, that is, the "normal shooting mode," the "high SN shooting mode" and the "automatic SN shooting mode" selected by the operation part 208. The control part 206 has a synthesis processing part 301, and performs synthesis processing for synthesizing the images of a plurality of row blocks shot at an exposure period longer than one frame period in the solid image sensor 101 to obtain an image having a high SN ratio.

The display part 206 includes, for example, a liquid crystal monitor. The display part 206 displays an image taken in the image buffer 203 (such as a live view image or a still image or moving image that is shot), an operation menu image output by the control part 205 or the like.

The memory card IF 207 is an interface to which a memory card 207a is fitted, and stores, in the memory card 207a, data (such as image data that is shot) output from the control part 205. Alternatively, the memory card IF 207 reads data (such as shot image data) stored in the memory card 207a according to the instruction of the control part 205, and outputs it to the control part 205.

The operation part 208 includes operation members such as a power supply button, A release button, a shooting mode dial, a menu button and a cross cursor button. A photographer uses these operation members to operate the electronic camera 200; operation information by these operation members is output to the control part 205. The control part 205 controls, according to the operation information input from the operation part 208, the overall operation of the electronic camera 200. In particular, in the electronic camera 200 according to the present embodiment, the photographer operates the shooting mode dial, and thereby can select any one of the three modes, that is, the "normal shooting mode," the "high SN shooting mode" and the "automatic SN shooting mode."

The photometry part 209 includes a photometry sensor including, for example, a photodiode. The photometry part 209 measures the brightness of the subject light incident from the shooting optical system 201, and outputs the result to the control part 205. Instead of the photometry part 209, the brightness of the subject light may be measured from a live view image sequentially shot with the solid state image sensor 101.

[Operation in "High SN Shooting Mode" and "Automatic SN Shooting Mode"]

An operation when the operation part 208 of the electronic camera 200 selects the "high SN shooting mode" or the "automatic SN shooting mode" will now be described. When the "high SN shooting mode" or the "automatic SN shooting mode" is selected, as described in the first embodiment, a plurality of frame images is taken in the image buffer 203 for each of a plurality of row blocks. For example, when the electronic camera 200 is set at the "high SN shooting mode" to shoot a still image, if the photographer presses down the release button of the operation part 208, the control part 205 takes, in the image buffer 203, the images of three frames shot at an exposure time longer than one frame period. Here, as described in the first embodiment, for example, since in the case of FIG. 6, the first two frames are used as discarded frames, at least five frame images are actually shot.

For example, in FIG. 5 described previously, as the first frame, the images of the row block A of the first, fourth and seventh rows are taken in the image buffer 203. Then, as the second frame, the images of the row block B of the second, fifth and eighth rows are taken in the image buffer 203, and as the third frame, the images of the row block C of the third, sixth and ninth rows are taken in the image buffer 203. Thereafter, the synthesis processing part 301 of the control part 205 synthesizes, with the image buffer 203, the images of the three row blocks, that is, the row blocks A, B and C, and generates image data including 9 pixels×9 pixels in the rows from the first row to the ninth row. Then, the control part 205 stores, in the memory card 107a, the synthesized image data as the shot images, through the memory card IF 207.

Here, since the image of each row block is a high SN image that is shot at an exposure time longer than one frame period, as the synthesized still image, the same high SN image is obtained.

Although, in the above description, the exposure time is equal to or more than one frame period, for example, in FIG. 6, at least one of the position of the exposure start timing and the position of the exposure completion timing is changed, and thus it is possible to obtain an arbitrary exposure time.

Furthermore, the exposure time may be changed in multiple steps according to the photometric value of the photometry part 209. Thus, it is possible to shoot an image having a more appropriate SN ratio according to the brightness of the subject.

The exposure time is controlled in association with the gain adjustment of the column amplifier CAMP (m) of the solid state image sensor 101, the level adjustment of the AFF 202 and the like, and thus it is possible to shoot an image while being exposed more appropriately.

Alternatively, a movement detection processing part that detects the movement of the subject is provided in the control part 205, and thus the exposure time may be automatically changed according to the movement of the subject. For example, the control part 205 decreases the exposure time when the movement of the subject detected by the movement detection processing part is more than a preset threshold value. By contrast, the control part 205 increases the exposure time when the movement of the subject detected by the movement detection processing part is less than the preset threshold value. In this way, for example, when celestial shooting is performed while automatic tracking is being performed with an equatorial telescope, since the movement of the subjects can be regarded as negligible, it is possible to perform, for example, a long-time exposure equal to or longer than a 9-frame period by division into 10 row blocks, with the result that it is possible to obtain an image having little noise, a high SN and a high quality by synthesizing 10 images after shooting.

Although the image shooting device according to the present invention has been described above using the examples of each embodiment, other various modifications are possible without departing from the spirit and the main features thereof. Hence, the embodiments described above are simply illustrative in all respects, and they should not be considered to be restrictive. The present invention is indicated by the scope of claims and is not limited by the text of the specification at all. Furthermore, all variations and modifications equivalent to the scope of claims fall within the scope of the present invention.

The many features and advantages of the embodiments are apparent from the detailed specification and, thus, it is intended by the appended claims to cover all such features and advantages of the embodiments that fall with in the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image shooting device comprising:
   a pixel part that is formed with a plurality of pixels arranged in a matrix; and
   a timing control part that provides an exposure start timing and a reading timing after exposure to the pixel part, wherein
   the timing control part sets a time interval between the exposure start timing and the reading timing to be longer than a preset frame rate and periodically reads an image signal from pixels of one of a plurality of blocks different for each frame when dividing the plurality of pixels arranged in the pixel part into the plurality of blocks and reading the image signal from the pixel part for each of the plurality of blocks at the preset frame rate.

2. The image shooting device according to claim 1, further comprising:
   a mode switching part that switches between a first mode in which the time interval between the exposure start timing and the reading timing of the timing control part is longer than the preset frame rate and a second mode in which the time interval between the exposure start timing and the reading timing is not longer than the preset frame rate, wherein
   the timing control part controls the exposure start timing and the reading timing according to a mode set by the mode switching part.

3. The image shooting device according to claim 2, further comprising,
   a photometry part that measures a brightness of a subject to be shot, wherein
   the mode switching part switches between the first mode and the second mode according to a photometric value of the photometry part.

4. The image shooting device according to claim 1, wherein
   the timing control part outputs the reading timing to a plurality of pixels in a same row of the pixel part in a frame different from a frame that outputs the exposure start timing.

5. The image shooting device according to claim 2, wherein
   the timing control part outputs the reading timing to a plurality of pixels in a same row of the pixel part in a frame different from a frame that outputs the exposure start timing.

6. The image shooting device according to claim 3, wherein
   the timing control part outputs the reading timing to a plurality of pixels in a same row of the pixel part in a frame different from a frame that outputs the exposure start timing.

7. The image shooting device according to claim 3, further comprising,
   an amplifier that is provided in each column of the pixel part, wherein
   an amplification factor of the amplifier is controlled according to the photometric value of the photometry part.

* * * * *